(12) United States Patent
Lee

(10) Patent No.: US 8,891,612 B2
(45) Date of Patent: *Nov. 18, 2014

(54) ENCODING AND DECODING MULTI-VIEW VIDEO WHILE ACCOMMODATING ABSENT OR UNRELIABLE CAMERA PARAMETERS

(75) Inventor: Yung-lyul Lee, Seoul (KR)

(73) Assignees: Samsung Electronics Co., Ltd., Suwon-si (KR); Industry-Academia Cooperation Group of Sejong University, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/537,769

(22) Filed: Jun. 29, 2012

(65) Prior Publication Data

US 2012/0262547 A1    Oct. 18, 2012

Related U.S. Application Data

(63) Continuation of application No. 13/219,300, filed on Aug. 26, 2011, now Pat. No. 8,228,981, which is a continuation of application No. 11/280,182, filed on Nov. 17, 2005, now Pat. No. 8,031,767.

(30) Foreign Application Priority Data

Mar. 31, 2005    (KR) .................. 10-2005-0027011

(51) Int. Cl.
| | | |
|---|---|---|
| G06K 9/00 | (2006.01) | |
| H04N 7/12 | (2006.01) | |
| H04N 19/597 | (2014.01) | |
| H04N 13/00 | (2006.01) | |
| H04N 13/02 | (2006.01) | |
| H04N 13/04 | (2006.01) | |

(52) U.S. Cl.
CPC ..... *H04N 13/0066* (2013.01); *H04N 19/00769* (2013.01); *H04N 13/025* (2013.01); *H04N 13/0445* (2013.01); *H04N 13/0242* (2013.01)
USPC ........ 375/240.01; 382/154; 382/233; 348/47; 348/218.1; 348/385.1

(58) Field of Classification Search
None
See application file for complete search history.

(56) References Cited

U.S. PATENT DOCUMENTS 6,055,012 A * 4/2000 Haskell et al. ........... 348/48
6,163,337 A   12/2000 Azuma et al.

(Continued)

FOREIGN PATENT DOCUMENTS

| JP | 6237476 A | 8/1994 |
|---|---|---|
| JP | 7327228 A | 12/1995 |

(Continued)

OTHER PUBLICATIONS

Microsoft (2002) Microsoft Computer Dictionary, 5th Ed., Microsoft Press, p. 272.*

(Continued)

*Primary Examiner* — Barry Drennan
(74) *Attorney, Agent, or Firm* — Sughrue Mion, PLLC

(57) ABSTRACT

A method of encoding multi-view video using camera parameters and a method of decoding multi-view video using the camera parameters are provided. The method of encoding multi-view video using the camera parameters includes detecting the camera parameters from each of a plurality of video data input from a multi-view camera in predetermined video units, and adaptively encoding each of the plurality of the video data according to whether each video data has the camera parameters. Accordingly, it is possible to increase the efficiency of compressing video without degrading video quality.

6 Claims, 10 Drawing Sheets

(56) References Cited

U.S. PATENT DOCUMENTS

| | | | |
|---|---|---|---|
| 6,757,445 | B1 | 6/2004 | Knopp |
| 6,990,230 | B2 | 1/2006 | Piponi |
| 6,999,513 | B2 * | 2/2006 | Sohn et al. ............... 375/240.16 |
| 7,035,453 | B2 * | 4/2006 | Liu ............................... 382/154 |
| 7,428,345 | B2 | 9/2008 | Caspi et al. |
| 7,468,745 | B2 | 12/2008 | Xin et al. |
| 8,238,439 | B2 * | 8/2012 | Pandit et al. ............. 375/240.25 |
| 2003/0035047 | A1 | 2/2003 | Katayama et al. |
| 2003/0202592 | A1 | 10/2003 | Sohn et al. |
| 2004/0027452 | A1 | 2/2004 | Yun et al. |
| 2004/0032488 | A1 | 2/2004 | Harman |
| 2004/0247174 | A1 * | 12/2004 | Lyons et al. ................. 382/154 |
| 2007/0081814 | A1 | 4/2007 | Ha et al. |
| 2008/0095231 | A1 | 4/2008 | Onno et al. |
| 2008/0303893 | A1 | 12/2008 | Kim et al. |
| 2009/0009508 | A1 | 1/2009 | Koo et al. |
| 2009/0022222 | A1 | 1/2009 | He et al. |
| 2009/0092311 | A1 | 4/2009 | Kim et al. |
| 2009/0185616 | A1 | 7/2009 | Pandit et al. |
| 2009/0207904 | A1 * | 8/2009 | Pandit et al. ............. 375/240.01 |
| 2010/0309286 | A1 | 12/2010 | Chen et al. |
| 2011/0001792 | A1 | 1/2011 | Pandit et al. |
| 2011/0221861 | A1 | 9/2011 | Jeon et al. |

FOREIGN PATENT DOCUMENTS

| | | |
|---|---|---|
| JP | 2000115695 A | 4/2000 |
| JP | 2001008205 A | 1/2001 |
| KR | 100207659 B1 | 4/1999 |
| KR | 2001-0108160 A | 12/2001 |
| KR | 20020032954 A | 5/2002 |
| KR | 20030083285 A | 10/2003 |
| WO | 01/41451 A1 | 6/2001 |
| WO | 03092304 A1 | 11/2003 |

OTHER PUBLICATIONS

Communication dated Feb. 14, 2012 issued by the Japanese Patent Office in counterpart Japanese Patent Application No. 2008-503951.
Kimata Hideaki, Trends of International MPEG 3DAV Standard of Three Dimensional (3D) Image Coding, Report from Information Procesing Society of Japan, Information Processing of Japan, Japan, Mar. 11, 2005, 7 pgs total.
Cooke et al. (Jan. 2005) "Proposal for specification of 3D camera parameters," ISO/IEC JTC1/SC29/WG11 MPEG2005/M11716.
Lee et al. (Oct. 2004) "Multi-view video coding using 2 D direct mode," ISO/IEC JTC1/SC29/WG11 MPEG2004/M11266.
International Organization for Standardization. (Oct. 2004) "Call for evidence on multi-view video coding," ISO/IEC JTC1/SC29/WG11 N6720.
Fecker et al. (Jul. 2004) "Coding of moving pictures and audio," ISO/IEC JTC1/SC29/WG11 Document M10929.
ISO/IEC. (Jan. 2005) "Survey of algorithms used for multi-view coding (MVC)," ISO/IEC JTC1/SC29/WG11 Document N6909.
Lee at al. (Nov. 16, 2005) "Multi-view video coding using illumination change-adaptive motion estimation and 2d direct mode," Proc. 6$^{th}$ Pacific Rim Conf. on Multimedia, LNCS 3767, pp. 396-407.
Pollefeys et al. (Aug. 1999) "Self-calibration and metric reconstruction in spite of varying and unknown intrinsic camera parameters," Int'l J. Computer Vision, vol. 32 No. 1, pp. 7-25.
Vetro et al. (Dec. 2004) "Coding approaches for end-to-end 3d TV systems," MERL Technical Report TR2004-137.
Zitnick et al. (Aug. 2004) "High-quality video interpolation using a layered representation," 2004 Int'l Conf. on Computer Graphics and Interactive Techniques (SIGGRAPH), pp. 600-608.
Communication dated Aug. 9, 2012, issued by the European Patent Office in counterpart Application No. 12173893.4.
Communication dated Aug. 9, 2012, issued by the European Patent Office in counterpart Application No. 12173889.2.
Communication dated Aug. 9, 2012, issued by the European Patent Office in counterpart Application No. 06732735.3.
J. Lim, et al., "A multiview sequence CODEC with view scalability", Signal Processing Image Communication, vol. 19, No. 3, XP004489364, Mar. 1, 2004, pp. 239-256.
J. Ohm, "Stereo/Multiview Video Encoding Using the MPEG Family of Standards", Proceedings of SPIE, vol. 3639, XP008022007, Jan. 25, 1999, pp. 242-255.
C. Fehn, et al., "Meta-Data Requirements for EE4 in MPEG 3DAV", Fraunhofer Institut Nachrichtentechnik Heinrich-Hertz-Institut (HHI), XP030038475, Mar. 4, 2003, 4 pgs.
S. Wurmlin, et al., "Image-space Free-viewpoint Video", ETH Zurich, and HHI, XP030039689, Jul. 14, 2004, 8 pgs.
E. Lamboray, et al., "Unconstrained Free-Viewpoint Video Coding", International Conference on Image Processing, vol. 5, XP010786493, Oct. 24, 2004, pp. 3261-3264.
G. Sullivan, et al., Proposed Amendments 3 and 4 to the Common Text ITU-T Recommendation H.262150/1EC 13818-2, Rapporteur for Q.15/16, XP030002658, Aug. 25, 1997, pp. 1-38.
"Stereoscopic Television MPEG-2 Multi-View Profile", http://www.itu.int/dms_pub/itu-r/opb/rep/R-REPBT.2017-1998-PDF-E.pdf, XP55034056, Jan. 1, 1998, pp. 1-7.
Communication dated Aug. 21, 2012, issued by the Japanese Patent Office in counterpart Application No. 2008-503951.
Communication dated Aug. 2, 2012, issued by the Korean Patent Office in counterpart Application No. 10-2005-0027011.
Communication, dated Apr. 16, 2013, issued by the Japanese Patent Office in counterpart Japanese Application No. 2012-110781.
Communication, dated Apr. 16, 2013, issued by the Japanese Patent Office in counterpart Japanese Application No. 2012-110782.
Communication, dated Jun. 5, 2013, issued by the European Patent Office in counterpart European Application No. 06732735.3.
Kimata, Hideaki; "Movement on MPEG 3DAV toward International Standardization of 3D Video," IPSI SIG Technical Report, Mar. 11, 2004, pp. 49-54.
Communication dated Sep. 11, 2013 issued by the European Patent Office in counterpart European Patent Application No. 12 173 893.4.
Communication dated Sep. 11, 2013 issued by the European Patent Office in counterpart European Patent Application No. 12 173 889.2.

* cited by examiner

ENCODING AND DECODING MULTI-VIEW VIDEO WHILE ACCOMMODATING ABSENT OR UNRELIABLE CAMERA PARAMETERS

CROSS-REFERENCE TO RELATED PATENT APPLICATIONS

The present application is a continuation of U.S. patent application Ser. No. 13/219,300, filed Aug. 26, 2011 which is a continuation of U.S. patent application Ser. No. 11/280,182, filed Nov. 17, 2005, which issued as U.S. Pat. No. 8,031,767, which claims the benefit of Korean Patent Application No. 10-2005-0027011, filed on Mar. 31, 2005. The disclosures of the prior applications are hereby incorporated in their entireties by reference.

BACKGROUND OF THE INVENTION

1. Field of the Invention

The present invention relates to encoding and decoding video, and more particularly, to encoding multi-view video using camera parameters and generating multi-view video using camera parameters.

2. Description of the Related Art

Video encoding using the Moving Picture Experts Group Layer 4 (MPEG-4) and H.264 standards involves encoding video captured by a camera and focuses mainly on an increase in the efficiency of encoding. However, in the fields of realistic communications or virtual reality, a scene is captured by several cameras to form a three-dimensional (3D) multi-view video. Thus, a method of effectively compress-encoding and reproducing a multi-view video that is formed is necessary.

However, conventional methods of compress-encoding and reproducing video are related to compress-encoding and reproducing video taken by a camera, and therefore it is difficult to apply such methods to multi-view video.

A conventional multi-view encoding method is disclosed in U.S. Patent Application Publication No. 2004/0027452A1.

SUMMARY OF THE INVENTION

The present invention provides a method and apparatus for effectively encoding multi-view video using camera parameters and a method and apparatus for generating multi-view video using camera parameters.

The present invention also provides a computer readable recording medium storing a program for executing the above methods.

According to one aspect of the present invention, there is provided a method of encoding multi-view video, the method including receiving a plurality of video data from at least one multi-view camera; determining whether each of the plurality of the video data which is received includes camera parameters in predetermined video units; and adaptively encoding each of the plurality of the video data in the predetermined video units according to whether each of the plurality of video data includes the camera parameters.

The method may further include inserting, into the plurality of vide data which is encoded, information which indicates whether each of the plurality of video data includes camera parameters into the encoded video data.

The method may further include determining whether the camera parameters of each of the plurality of video data are reliable if the plurality of the video data includes camera parameters.

The camera parameters may comprise at least one of intrinsic parameters regarding intrinsic camera characteristics and extrinsic parameters regarding extrinsic camera characteristics. The intrinsic parameters may comprise at least one of a focal length, a principal point, width and height of a pixel, a skew angle, the numbers of horizontal and vertical pixels of a camera sensor, a radial distortion coefficient, and a tangential distortion coefficient. The extrinsic parameters may comprise camera location information.

Whether the camera parameters are reliable may be determined based on whether at least one of zooming and panning of the at least one multi-view camera is performed.

When adaptively encoding the plurality of video data, only the video data with camera parameters may be used as reference video data.

When adaptively encoding the plurality of video data, only video data that includes camera parameters which are determined to be reliable may be used as reference video data.

The predetermined video units may be units of slices, and the camera parameter information indicating whether the camera parameters exist and are reliable may be inserted as a 2-bit flag into a slice header of each input bitstream.

According to another aspect of the present invention, there is provided a computer readable recording medium having embodied thereon a program for executing a method of encoding multi-view video is stored, wherein the method comprises receiving a plurality of video data from at least one multi-view camera; determining whether each of the plurality of the video data which is received includes camera parameters in predetermined video units; and adaptively encoding each of the plurality of the video data in the predetermined video units according to whether each video data includes the camera parameters.

According to yet another aspect of the present invention, there is provided an apparatus for encoding multi-view video, the apparatus including an input unit which receives a plurality of video data from at least one multi-view camera; a camera parameters detector which detects camera parameters in the plurality of the video data which is received in predetermined video units; and an encoder which adaptively encodes each of the plurality of video data in the predetermined video units according to whether the camera parameters exist.

According to still another aspect of the present invention, there is provided a method of encoding multi-view video, the method including detecting camera parameters of current video and at least one adjacent video; and adaptively encoding the current video according to whether the current video and the at least one adjacent video include camera parameters.

According to still another aspect of the present invention, there is provided a computer readable recording medium having embodied thereon a program for executing a method of encoding multi-view video is stored, wherein the method comprises detecting camera parameters of current video and at least one adjacent video; and adaptively encoding the current video according to whether the current video and the at least one adjacent video include the camera parameters.

According to still another aspect of the present invention, there is provided an apparatus for encoding multi-view video, the apparatus including a detector which detects camera parameters of current video and at least one adjacent video; and an encoder which adaptively encodes the current video according to whether the current video and the at least one adjacent video include the camera parameters.

According to still another aspect of the present invention, there is provided a method of generating multi-view video using camera parameter information, the method including extracting camera parameter information of each video from input bitstreams in predetermined video units; and generating video based on the extracted camera parameter information.

According to still another aspect of the present invention, there is provided a computer readable recording medium having embodied thereon a program for executing a method of encoding multi-view video using camera parameter information is stored, wherein the method comprises extracting camera parameter information of each video from input bitstreams in predetermined video units; and generating video based on the extracted camera parameter information.

According to still another aspect of the present invention, there is provided an apparatus for generating multi-view video using camera parameter information, the apparatus comprising a camera parameter information extracting unit which extracts camera parameter information of each video from an input bitstream in predetermined video units; and a video generating unit which generates video based on the extracted camera parameter information.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, exemplary embodiments of the present invention will be described in detail with reference to the accompanying drawings.

Figure 1:
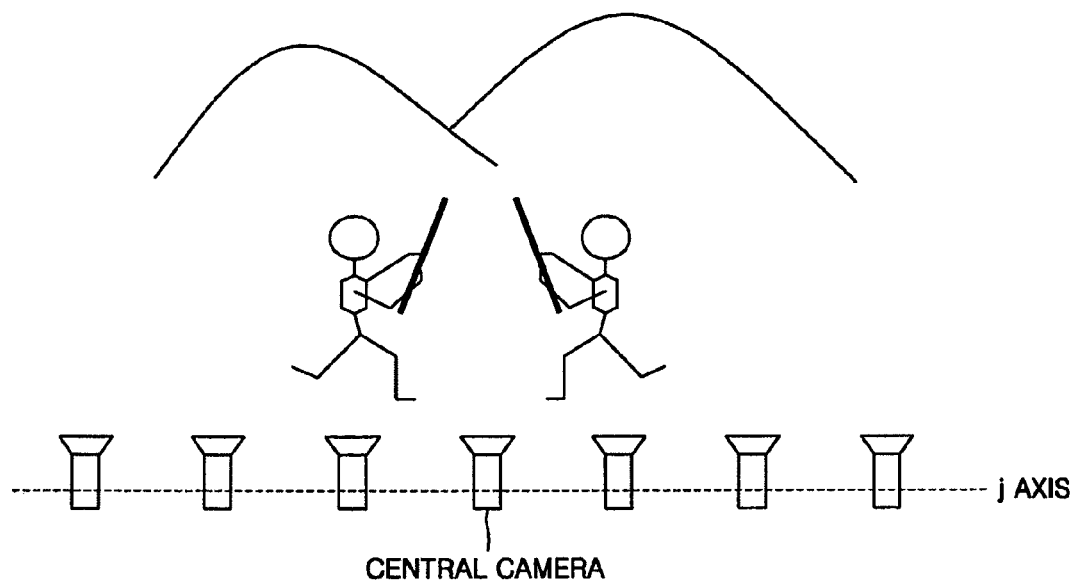
FIG. 1 illustrates positions of cameras for obtaining multi-view video.

FIG. 1 illustrates positions of a plurality of cameras installed for receiving and encoding multi-view video in a one-dimensional line. In exemplary embodiments of the present invention, it is assumed that cameras are installed in a two-dimensional (2D) arrangement along an i-axis and a j-axis. However, a case where cameras are installed one-dimensionally, i.e., when i=0, will first be described.

Figure 2:
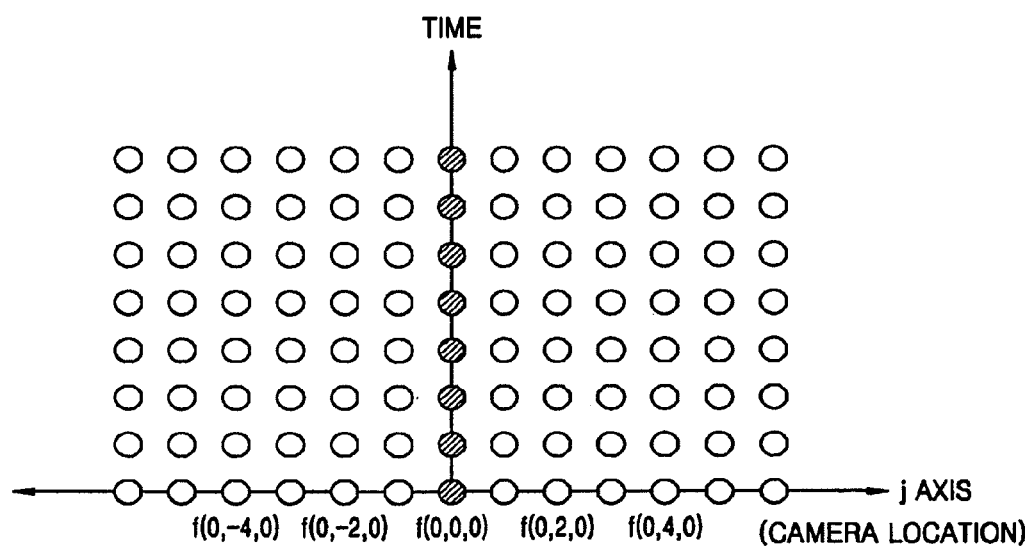
FIG. 2 illustrates videos captured by a plurality of cameras according to time.

FIG. 2 is a coordinate system used to organize frames captured by a plurality of cameras according to time. In FIG. 2, a frame captured by a predetermined camera at a predetermined instant of time is indicated with $f(i,j,t)$. Here, i and j denote positions of a camera, and t denotes time. Referring to FIGS. 1 and 2, the cameras are installed in a one-dimensional line, that is, i=0 for all of the cameras. For instance, $f(0,0,0)$ denotes a first frame captured by a central camera.

Figure 3:
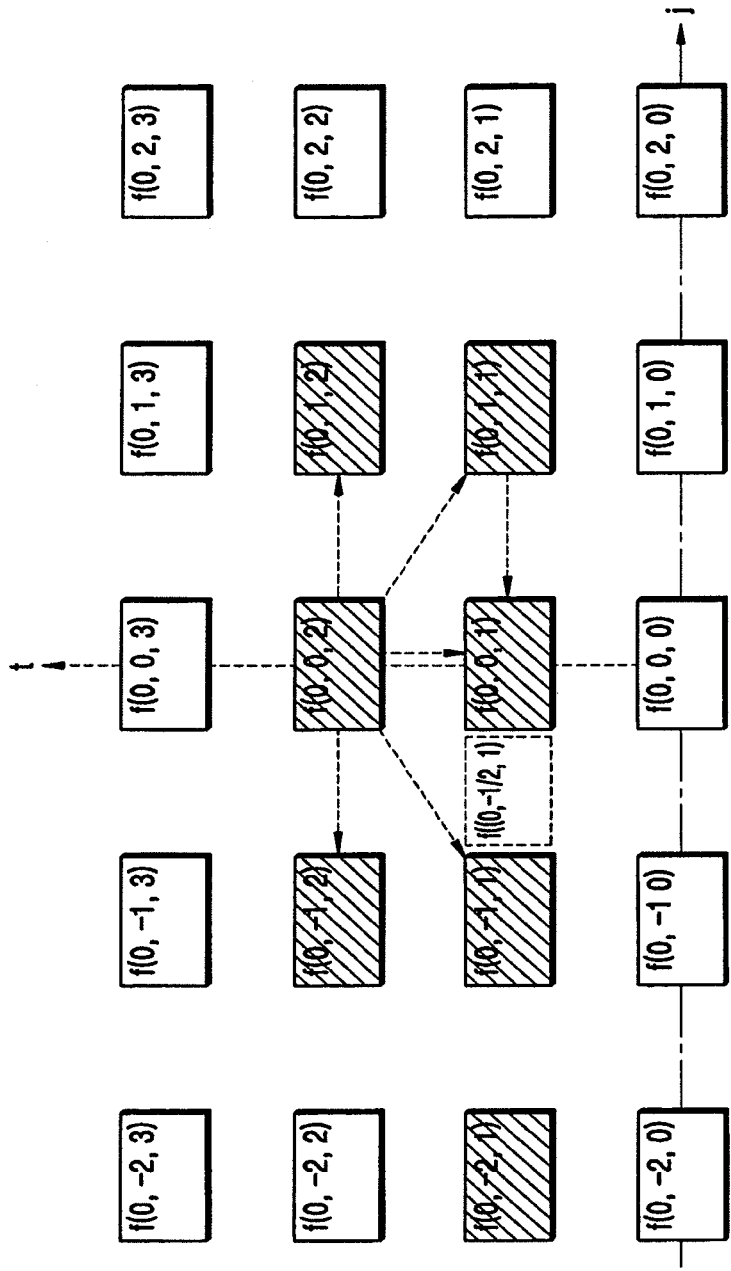
FIG. 3 is a diagram illustrating spatial-temporal prediction coding used in exemplary embodiments of the present invention.

FIG. 3 is a diagram illustrating spatial-temporal prediction coding used in exemplary embodiments of the present invention. Referring to FIG. 3, frame $f(0,0,2)$, which is a frame captured by the central camera can be encoded with reference to adjacent frames $f(0,-1,2)$, $f(0,-1,1)$, $f(0,0,1)$, $f(0,1,1)$, and $f(0,1,2)$. The spatial-temporal prediction coding allows more frames to be referred to during the coding, thereby improving the quality of a reproduced video.

Figure 4:
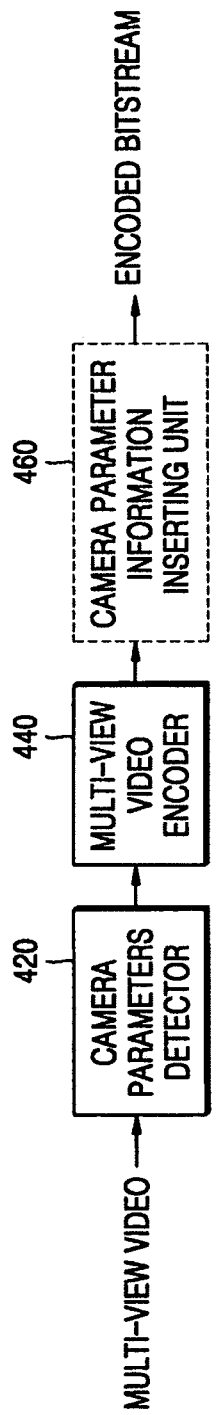
FIG. 4 is a block diagram of an apparatus for encoding multi-view video according to an exemplary embodiment of the present invention.

FIG. 4 is a block diagram of an apparatus for encoding multi-view video according to an exemplary embodiment of the present invention. The apparatus includes a camera parameters detector 420, a multi-view video encoder 440, and a camera parameter information inserting unit 460.

The camera parameters detector 420 detects camera characteristics information, e.g., camera parameter information, regarding each frame from video data received from a plurality of cameras. The camera parameters may be divided into intrinsic parameters and extrinsic parameters.

The intrinsic parameters include a focal length, a principal point, pixel width and height, a skew angle, the numbers of horizontal and vertical pixels on a camera sensor, a radial distortion coefficient, and a tangential distortion coefficient. The extrinsic parameters include location information of a camera, such as the coordinates of the camera in a world coordinate system, and a radian or an angle on coordinates x, y, and z.

The camera parameters detector 420 detects whether each frame of the input multi-view video has the camera parameters and transmits the result of detection to the multi-view video encoder 440.

Since some of the plurality of cameras forming the multi-view video may not transmit the camera parameters, whether the camera parameters exist must be determined. When video input from a camera does not have the camera parameters, it is impossible to interpolate multi-view video (i.e., intermediate-view video) using the input video when encoding adjacent videos.

For example, referring to FIG. 3, if a frame $f(0,0,1)$ has the camera parameters but a frame $f(0,-1,1)$ does not have the camera parameters, it is impossible to interpolate a frame $f(0,-1/2,1)$ between the frames $f(0,0,1)$ and $f(0,-1,1)$ using the frames $f(0,0,1)$ and $f(0,-1,1)$. In this case, when a frame $f(0,-2,1)$ has the camera parameters, the frame $f(0,-1/2,1)$ must be interpolated using the frames $f(0,0,1)$ and $f(0,-2,1)$.

Determining whether the camera parameters exist in each video may also be useful for encoding video data, which will later be described.

Accordingly, a process of detecting whether the camera parameters exist in each of the videos input from n cameras used to capture multi-view video is required.

In the present exemplary embodiment, it is assumed that the camera parameters are included in slice headers in units of slices of input video, and whether the camera parameters are included in the slice header of the input video is determined. Alternatively, the camera parameters may be included in a position other than the slice header of the input video in units of other than slices, e.g., in units of macro blocks.

The multi-view video encoder 440 encodes each input frame according to whether there is camera parameter information of each input frame. For instance, when all the frames f(0,−1,1), f(0,0,1), and f(0,1,1) illustrated in FIG. 3 have the camera parameters, the frame f(0,0,1) can be reproduced by interpolation using a decoder (not shown) based on the adjacent frames f(0,−1,1) and f(0,1,1). Thus, it is possible to skip compressing the frame f(0,0,1), skip transmitting the result of compressing the frame f(0,0,1), or to compress and transmit difference data obtained from a difference between the frame f(0,0,1) and an interpolation frame f(0,0,1) obtained by interpolating the frame f(0,0,1) using the adjacent frames f(0,−1,1) and f(0,1,1).

According to the present exemplary embodiment, it is possible to selectively skip compressing multi-view video that can be interpolated by the decoder, skip transmitting the compressed video, or to compress and transmit a difference between a current frame and interpolation video, thereby increasing the efficiency of video compression without degrading video quality.

The camera parameter information inserting unit 460, which may additionally be included in the present exemplary embodiment, inserts the camera parameter information that indicates whether each video has the camera parameters, into a predetermined point of a bitstream encoded by the multi-view video encoder 440.

According to the present exemplary embodiment, the camera parameter information is a 1-bit Camera_Parameter_Existing_Flag that is inserted as a syntax element into a slice header of each video in units of slices. The encoded bitstream into which the camera parameter information is inserted is transmitted to the decoder.

Alternatively, it is possible to insert the camera parameter information in units of macro blocks, and transmit the camera parameter information as additional information separated from information regarding the video.

Figure 5:
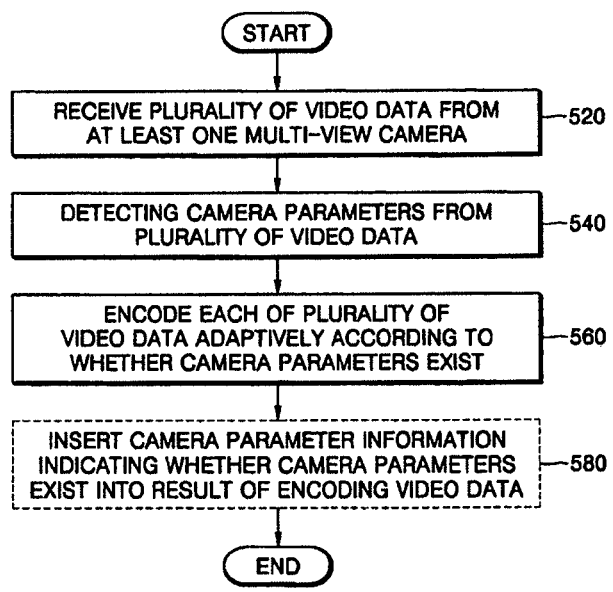
FIG. 5 is a flowchart illustrating a method of encoding multi-view video according to an exemplary embodiment of the present invention.

FIG. 5 is a flowchart illustrating a method of encoding multi-view video using the apparatus of FIG. 4 according to an exemplary embodiment of the present invention. Referring to FIG. 5, a plurality of video data are received from an at least one multi-view camera (operation 520).

Next, whether a current frame and adjacent frames have camera parameters is determined (operation 540).

Next, adaptive encoding is performed on a current frame according to whether the current frame and the adjacent frames have the camera parameters (operation 560). If the current frame does not have the camera parameters, the current frame is encoded for compression. If the current frame has the camera parameters, then whether the adjacent frames have the camera parameters is determined. When the adjacent videos have the camera parameters, adaptive encoding is performed on the current frame on the basis of the adjacent frames using the multi-view video encoder 440.

Next, information indicating whether the camera parameters exist in an adjacent frame is added to the encoded current frame (operation 580). Operation 580 is optional.

Operations 560 and 580 will now be described in greater detail with reference to FIG. 3. If the current frame f(0,0,1) and the adjacent frames f(0,−1, 1) and f(0, 1, 1) illustrated in FIG. 3 have the camera parameters, the camera parameters of the current frame f(0,0,1) are transmitted without encoding the current frame f(0,0,1). A camera parameter flag indicating that the current frame f(0,0,1) has the camera parameters is inserted into a bitstream, e.g., into a slice header, to be transmitted. In this case, the current frame f(0,0,1) is reproduced by decoding the current frame f(0,0,1) using its camera parameters, the adjacent frames f(0,−1,1) and f(0,1,1), and the camera parameters of the adjacent frames f(0,−1,1) and f(0,1,1).

Alternatively, when the adjacent frames f(0,−1,1) and f(0,1,1) have the camera parameters, only the camera parameters of the current frame f(0,0,1), and a difference between the current frame f(0,0,1) and interpolation frame f(0,0,1) obtained by interpolating the current frame f(0,0,1) using the adjacent frames f(0,−1,1) and f(0,1,1) are transmitted. Similarly, a camera parameter flag indicating that the camera parameters of the current frame f(0,0,1) exist is inserted into a bitstream to be transmitted. In this case, the current frame f(0,0,1) is reproduced by decoding the current frame f(0,0,1) using its camera parameters, the difference and the adjacent frames f(0,−1,1) and f(0,1,1) and their camera parameters.

When only one of the frames closest to the current frame has the camera parameters, it is possible to transmit only the camera parameters of the current frame f(0,0,1) without encoding the current frame f(0,0,1). In this case, when reproducing the current frame f(0,0,1), the current frame f(0,0,1) is decoded using its camera parameters, the closest frame having the camera parameters, and the camera parameters of the closet videos. Further, the current frame f(0,0,1) can be reproduced using a nearby frame, e.g., frame f(0,−1,2), which has the camera parameters and is close to an adjacent frame that does not have the camera parameters, and the camera parameter of the nearby frame. The current frame f(0,0,1) may be reproduced based on the frame f(0,−1,2) when the frame f(0,−1,2) is a P frame and the current frame f(0,0,1) is a B frame based on the frame f(0,−1,2).

Figure 6:
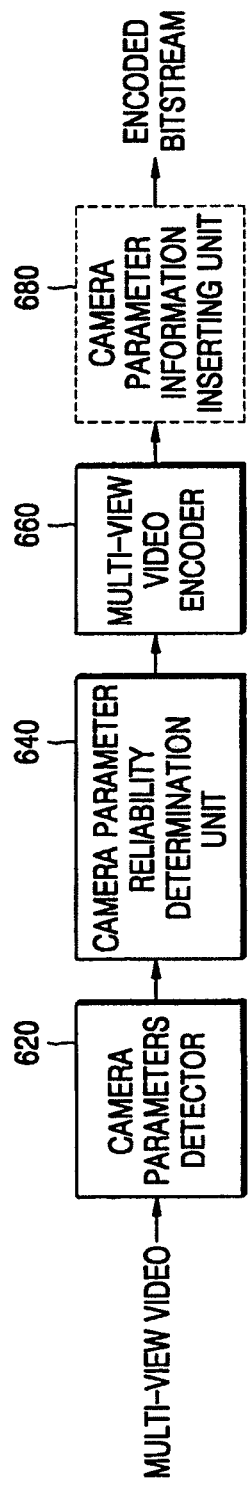
FIG. 6 is a block diagram of an apparatus for encoding multi-view video according to another exemplary embodiment of the present invention.

FIG. 6 is a block diagram of an apparatus for encoding multi-view video according to another exemplary embodiment of the present invention. The apparatus includes a camera parameters detector 620, a camera parameter reliability determination unit 640, a multi-view video encoder 660, and a camera parameter information inserting unit 680.

The operation of the camera parameters detector 620 is the same as that of the camera parameters detector 420 of FIG. 4.

The camera parameter reliability determination unit 640 determines whether the camera parameters of a frame are reliable when the camera parameters are determined to exist in the frame by the camera parameters detector 620. In the present exemplary embodiment, when camera zooming and panning are used in capturing the video, the camera parameters of the video are determined to be unreliable. Alternatively, the reliability of the camera parameters may be determined by predetermined conditions, e.g., camera tilting, a change in camera position, and a change in a focal length, in addition to camera zooming and panning.

If all the frames f(0,−1,1), f(0,0,1), and f(0,1,1) have reliable camera parameters, the frame f(0,0,1) can be reproduced by a decoder by interpolation using the adjacent frames f(0,−1,1) and f(0,1,1). Therefore, the frame f(0,0,1) may not be encoded, the result of encoding the frame f(0,0,1) may not be transmitted, or the frame f(0,0,1) and difference between the frame f(0,0,1) and the interpolation frame f(0,0,1) obtained by interpolating the frame f(0,0,1) using the adjacent frames f(0,−1,1) and f(0,1,1) may be encoded and transmitted. In this case, even if the frame f(0,0,1) is not transmitted, the camera parameters of the frame f(0,0,1) must be transmitted to the decoder to reproduce the frame f(0,0,1).

On the other hand, if all the frames f(0,−1,1), f(0,0,1), and f(0,1,1) have the camera parameters but the camera parameters are not reliable for frame f(0,−1,1) due to use of camera zooming or panning, for example, in capturing frame f(0,−1,1), frame f(0,0,1) cannot be reproduced from the adjacent frames f(0,−1,1) and f(0,1,1) by the decoder. Accordingly, the frame f(0,0,1) must be compressed and transmitted, or a difference between the frame f(0,0,1) and the interpolation frame f'(0,0,1), which is obtained by interpolating the frame f(0,0,1) using the adjacent frames f(0,1,1) and f(0,−1,2), must be compressed and transmitted. This is because an interpolation frame obtained by interpolating a frame using frames whose camera parameters are not reliable due to camera palming may distort an image.

As described above, the multi-view video encoder 660 performs adaptive encoding on input video according to whether the camera parameters exist, which is determined by the camera parameters detector 620, and the reliability of the camera parameters, which is determined by the camera parameter reliability determination unit 640.

The camera parameter information insertion unit 680, which is optional, divides 2-bit camera parameter information of each frame (i.e., Camera_Parameter_Existing_Flag indicating whether the camera parameters exist and Guaranteed_Camera_Parameter_Flag regarding the reliability of the camera parameters) into two 1-bit information values, and inserts the two bits as a syntax element into a slice header of each video to be transmitted in units of slices. Alternatively, the 2-bit camera parameter information may be inserted into the slice header in units of macro blocks or transmitted as additional information separately from the video.

Figure 7:
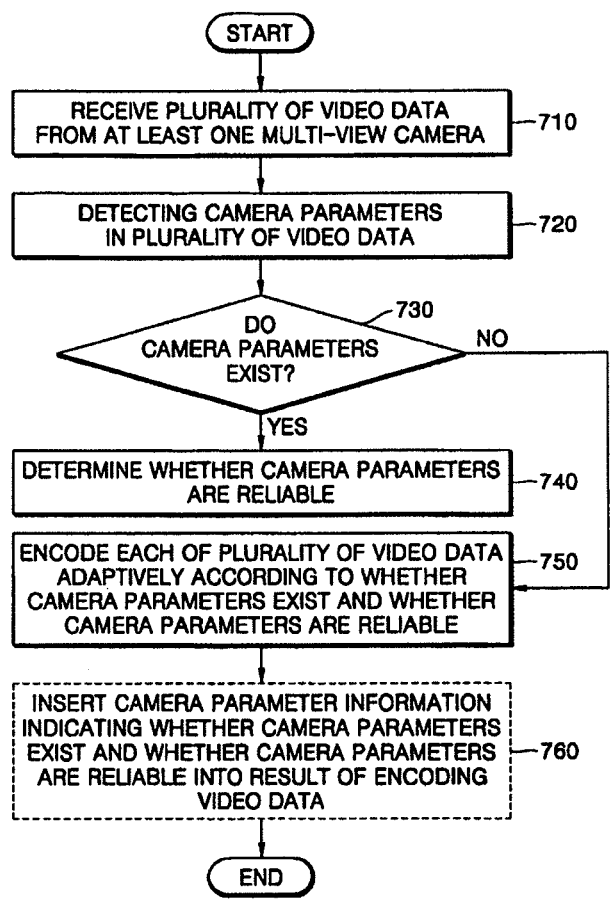
FIG. 7 is a flowchart illustrating a method of encoding multi-view video according to another exemplary embodiment of the present invention.

FIG. 7 is a flowchart illustrating a method of encoding multi-view video using the apparatus of FIG. 6 according to an exemplary embodiment of the present invention. Referring to FIG. 6, a plurality of video data are received from at least one multi-view camera (operation 710).

Next, whether a current frame and adjacent frames have the camera parameters is determined (operation 720).

Next, when it is determined that the current frame and the adjacent frames have the camera parameters (operation 730), the method proceeds to operation 740. If it is determined in operation 730 that either the current video or the adjacent frames do not have the camera parameters, the method proceeds to operation 750.

Next, whether the camera parameters of the current frame and the adjacent frames are reliable is determined (operation 740).

Next, adaptive encoding is performed on the current frame according to the results of operations 720 and 740 (operation 750). For instance, when either the current frame or the adjacent frames do not have the camera parameters, the current video is encoded.

Referring to FIG. 3, when all the current frame f(0,0,1) and the adjacent frames f(0,−1,1) and f(0,1,1) have reliable camera parameters, only the camera parameters of the current frame f(0,0,1) are transmitted without being encoded. In this case, when reproducing the current frame f(0,0,1), the current frame f(0,0,1) is decoded using its camera parameters, the adjacent frames f(0,−1,1) and f(0,1,1), and their camera parameters.

When all the frames f(0,−1,1), f(0,0,1), and f(0,1,1) have camera parameters but the camera parameters of the frame f(0,−1,1) are not reliable due to camera zooming or panning when capturing the frame f(0,−1,1), a decoder cannot reproduce the frame f(0,0,1) from the adjacent frames f(0,−1,1) and f(0,1,1). Therefore, the frame f(0,0,1) must be compressed and transmitted, or a difference between the frame f(0,0,1) and interpolation frame f'(0,0,1) obtained by interpolating the frame f(0,0,1) using the adjacent frames f(0,1,1) and f(0,−1,2) is compressed and transmitted.

Next, the camera parameter information specifying whether the camera parameters exist and are reliable is inserted into the encoded video data (operation 760). Operation 760 is optional.

If it is determined in operation 720 that the current frame has camera parameters but it is determined in operation 740 that the camera parameters are not reliable, a camera parameter flag indicating that the camera parameters of the current frame exist but are not reliable is inserted into a slice header of an encoded bitstream. In the present exemplary embodiment, the camera parameter information indicating whether the camera parameters exist and are reliable is inserted as a 2-bit flag into a slice header in units of slices.

Figure 8:
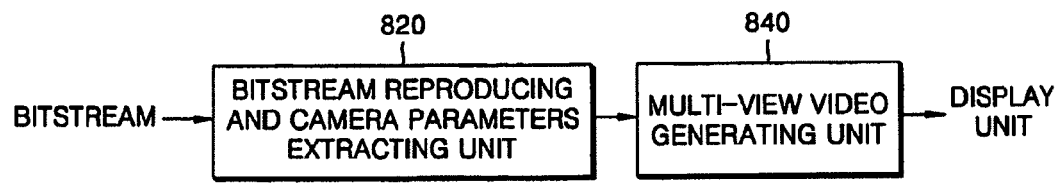
FIG. 8 is a block diagram of an apparatus for decoding multi-view video according to an exemplary embodiment of the present invention.

FIG. 8 is a block diagram of an apparatus for decoding multi-view video according to an exemplary embodiment of the present invention. The apparatus includes a bitstream reproducing and camera parameters extracting unit 820 and a multi-view video generating unit 840.

The bitstream reproducing and camera parameters extracting unit 820 determines whether each video has camera parameters while reproducing frames of input bitstreams. In the present exemplary embodiment, whether each video has the camera parameters is determined using 1-bit camera parameter information (i.e., Camera_Parameter_Existing_Flag) which is inserted into a slice header of each frame. The camera parameters are determined to exist when the Camera_Parameter_Existing_Flag is "1", and determined not to exist when the Camera_Parameter_Existing_Flag is "0".

The multi-view video generating unit 840 generates multi-view video, and interpolation video at each point in time, e.g., at an intermediate view, based on the camera parameter information extracted by the bitstream reproducing and camera parameters extracting unit 820.

For example, referring to FIG. 3, when only the frames f(0,−1,1) and f(0,1,1) have the camera parameters, an encoder does not transmit data regarding the frame f(0,0,1) or transmits only a difference between the frame f(0,0,1) and an interpolation frame f(0,0,1) obtained by interpolating the frame f(0,0,1) using the adjacent frames f(0,−1,1) and f(0,1,1). In this case, the frame f(0,0,1) is reproduced using its camera parameters, the adjacent frames f(0,−1,1) and f(0,1,1), and their camera parameters.

A situation where the Camera_Parameter_Existing_Flag of each of the input frames f(0,0,0), f(0,0,1), and f(0,−1,0) is "1" and the Camera_Parameter_Existing_Flag of the frame f(0,−1,1) is "0", (i.e., when the frames f(0,0,0), f(0,0,1), and f(0,−1,0) have the camera parameters but the video (0,−1,1) does not have camera parameters) will now be described with reference to FIG. 9.

Figure 9:
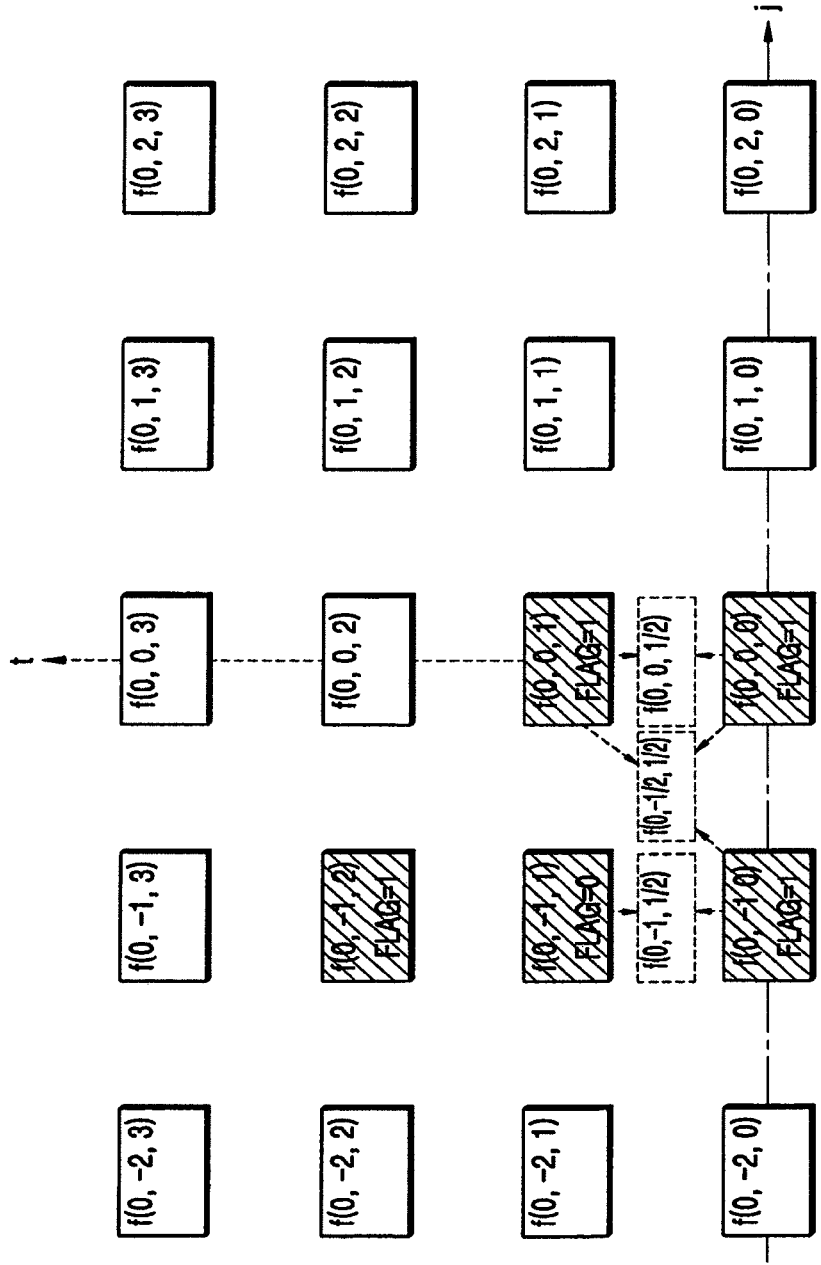
FIG. 9 is a diagram illustrating a method of generating intermediate-view video according to an exemplary embodiment of the present invention.

Referring to FIG. 9, when an intermediate-view frame f(0,0,1/2) between frames f(0,0,1) and f(0,0,0) is to be interpolated, the multi-view video generating unit 840 checks the camera parameter flags of the frames f(0,0,1) and f(0,0,0), and interpolates the intermediate-view frame f(0,0,1/2) using the frames f(0,0,1) and f(0,0,0) only when both the camera parameter flags are "1". In this case, since both the camera parameter flags are assumed to be "1", the intermediate-view frame f(0,0,1/2) can be generated based on the frames f(0,0,1) and f(0,0,0).

Since the flag of the camera parameter of the frame f(0,−1,1) is "0", i.e., the camera parameters of the frame f(0,−1,1) do not exist, intermediate-view frame f(0,−1,1/2) between frames f(0,−1,1) and f(0,−1,0) is interpolated using only the frame f(0,−1,0). Otherwise, if the flag of the camera parameters of the frame f(0,−1,2) has the value of "1", the intermediate view frame f(0,−1,1/2) is generated using the frames f(0,−1,0) and f(0,−1,2).

To generate an intermediate-view frame f(0,−1/2,1/2) among the frames f(0,−1,1), f(0,0,1), f(0,0,0), and f(0,−1,0), the multi-view video generating unit 840 checks the flags of the camera parameters of the frames f(0,−1,1), f(0,0,1), f(0,0,0), and f(0,−1,0) and interpolates the intermediate-view frame f(0,−1/2,1/2) using the frames f(0,−1,1), f(0,0,1), f(0,0,0), and f(0,−1,0) which have the camera parameter flags set to be "1". In present exemplary embodiment, the flag of the camera parameters of the frame f(0,−1,1) is "0", that is, the camera parameters of the frame f(0,−1,1) does not exist, and thus, the intermediate-view frame f(0,−1/2,1/2) is interpolated using the frames f(0,0,1), f(0,0,0), and f(0,−1,0).

Multi-view video is generated by the multi-view video generating unit 840, and intermediate-view videos that are selectively generated are transmitted to and displayed on a display unit (not shown).

As described above, according to an exemplary embodiment of the present invention, intermediate-view frame is adaptively generated according to whether each frame has camera parameters, thereby improving the quality of the intermediate view frame.

An apparatus for decoding multi-view video according to another exemplary embodiment of the present invention will now be described with reference to FIG. 8. Referring FIG. 8, the bitstream reproducing and camera parameters extracting unit 820 determines whether each frame has camera parameters while reproducing frames included in an input bitstream. In the present exemplary embodiment, whether each frame has camera parameters and whether the camera parameters are reliable are determined according to 2-bit parameter information (i.e., Camera_Parameter_Existing_Flag and Guaranteed_Camera_Parameter_Flag) which is included in a slice header of each frame.

The multi-view video generating unit 840 generates multi-view video, and selectively generates intermediate-view interpolation video based on the camera parameter information detected by the bitstream reproducing and camera parameters extracting unit 820.

Referring to FIG. 3, when the frames f(0,−1,1) and f(0,1,1) have reliable camera parameters and the frame f(0,0,1) is not transmitted, a decoder reproduces the frame f(0,0,1) using reliable videos (e.g., the frames f(0,−1,1) and f(0,1,1), which are adjacent to the frame f(0,0,1) and have the camera parameters) the camera parameters of the reliable videos, and the camera parameters of the frame f(0,0,1).

If the frames f(0,−1,1) and f(0,1,1) have camera parameters but the camera parameters of the frame f(0,−1,1) are not reliable, and difference data obtained from a distance between the frame f(0,0,1) and an interpolation frame f (0,0,1) obtained by interpolating the frame f(0,0,1) using the frames f(0,−2,1) and f(0,1,1) is transmitted, the frame f(0,0,1) is reproduced using the difference data, data of the frames f(0,−2,1) and f(0,1,1), the camera parameters of the frames f(0,−2,1) and f(0,1,1), and the camera parameters of the frame f(0,0,1).

A situation in which the Camera_Parameter_Existing_Flag and the Guaranteed_Camera_Parameter_Flag of each of the frames f(0,0,0), f(0,−1,0) and f(0,0,1) are each "1", and those of the frame f(0,−1,1) are respectively "1" and "0" (i.e., when the frames f(0,0,0), f(0,−1,0), and f(0,0,1) have reliable camera parameters and the frame f(0,−1,1) has unreliable camera parameters) will now be described with reference to FIG. 10.

Figure 10:
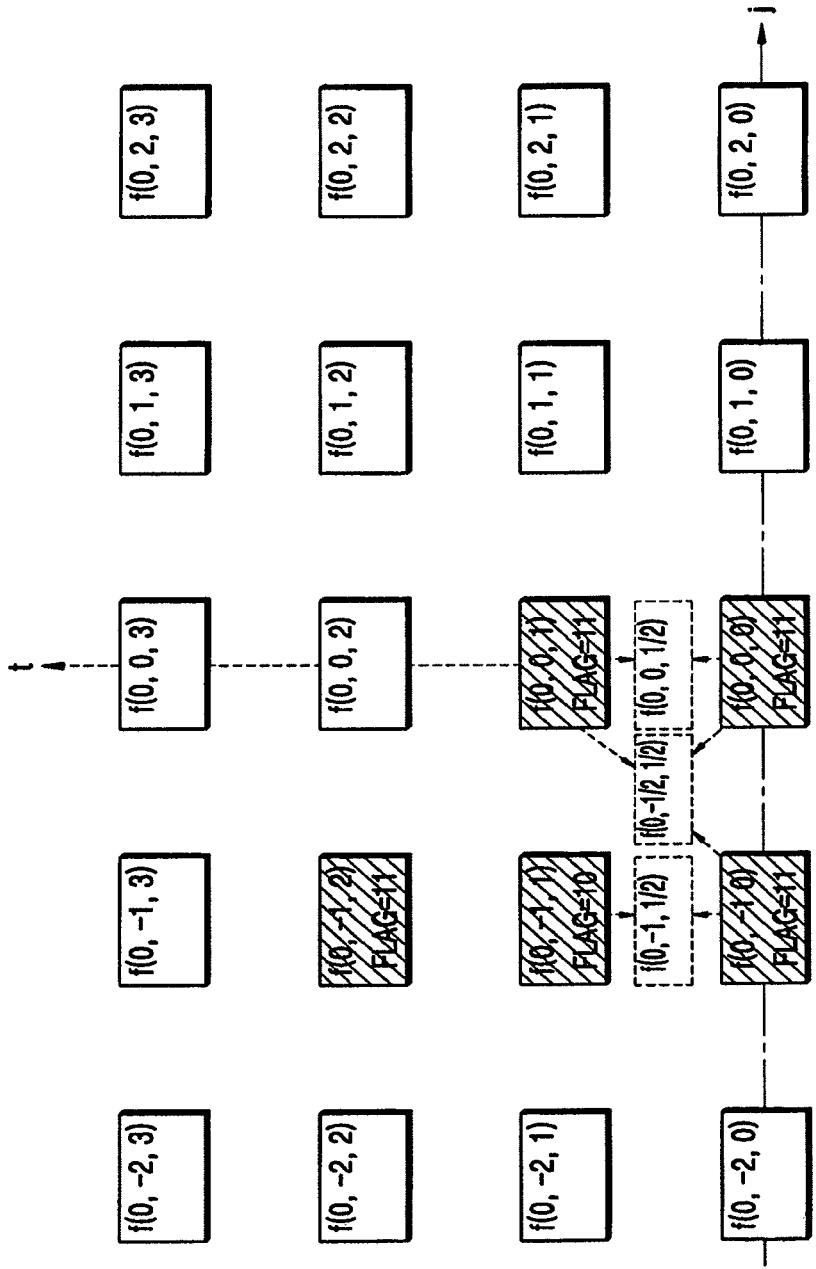
FIG. 10 is a diagram illustrating a method of generating intermediate-view video according to another exemplary embodiment of the present invention.

Referring to FIG. 10, when interpolating an intermediate-view frame f(0,0,1/2) between the frames f(0,0,1) and f(0,0,0), the multi-view video generating unit 840 checks the flags of the camera parameters of the frames f(0,0,1) and f(0,0,0), and interpolates the intermediate-view frame f(0,0,1/2) using the frames f(0,0,1) and f(0,0,0) only when both the flags are "1". Since both the flags are "1" in FIG. 10, the intermediate-view frame f(0,0,1/2) can be generated using the frames f(0,0,1) and f(0,0,0).

An intermediate-view frame f(0,−1,1/2) between the frames f(0,−1,1) and f(0,−1,0) is interpolated using only the frame f(0,−1,0), since the camera parameter flags of the frame f(0,−1,1) are "1" and "0", respectively (i.e., the camera parameters of the frame f(0,−1,1) exist but are not reliable). If the camera parameter flags of the frame f(0,−1,2) are both "1", the intermediate-view frame f(0,−1,1/2) is obtained using the frames f(0,−1,0) and f(0,−1,2).

To obtain an intermediate-view frame f(0,−1/2,1/2) among the frames f(0,−1,1), f(0,0,1), f(0,0,0), and f(0,−1,0), the multi-view video generating unit 840 checks the camera parameter flags of the frames f(0,−1,1), f(0,0,1), f(0,0,0), and f(0,−1,0) and interpolates the intermediate-view frame f(0,−1/2,1/2) using the frames which have both camera parameter flags set to "1". Referring to FIG. 10, since the values of the camera parameter flags of the frame f(0,−1,1) are respectively "1" and "0", that is, the camera parameters exist but are not reliable, the intermediate-view frame f(0,−1/2,1/2) is interpolated using the frames f(0,0,1), f(0,0,0), and f(0,−1,0).

Multi-view video generated and intermediate-view frames selectively generated by the multi-view video generating unit 840 are transmitted to and displayed on a display unit (not shown).

Figure 11:
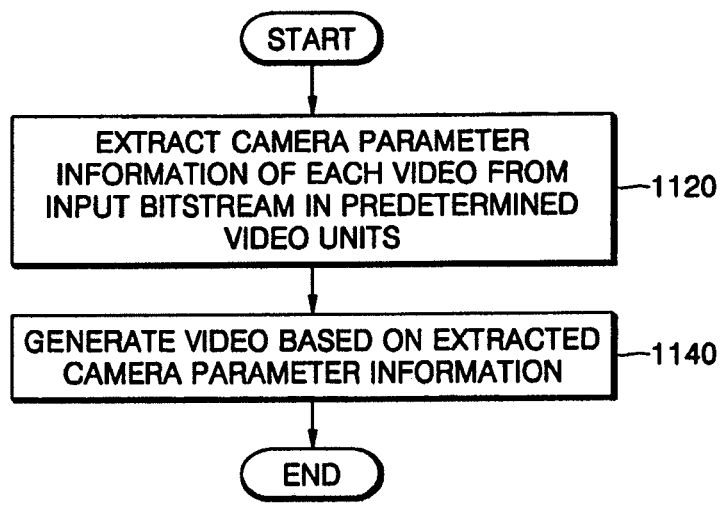
FIG. 11 is a flowchart illustrating a method of decoding multi-view video using an apparatus for decoding the multi-view video according to an exemplary embodiment of the present invention.

FIG. 11 is a flowchart illustrating a method of decoding multi-view video using the apparatus of FIG. 8 according to an exemplary embodiment of the present invention. Referring to FIG. 11, camera parameter information of each frame is extracted from input bitstreams in predetermined units of video (operation 1120).

Next, video is generated based on the camera parameter information extracted in operation 1120 (operation 1140).

In the present exemplary embodiment, reference frames to be used in interpolating the generated frames are determined according to the extracted camera parameter information. Next, the generated frames are interpolated by the multi-view video generating unit 840 using the reference frames.

According to an exemplary embodiment of the present invention, when the camera parameter information indicates only whether frames have the camera parameters, only frames that are adjacent to the frame to be interpolated and have camera parameters are used as reference frames when interpolating the frame.

Alternatively, when the camera parameter information indicates whether each frame has camera parameters and whether the camera parameters are reliable, only frames that are adjacent to the frame to be interpolated and have reliable camera parameters are used as reference frames when interpolating the video.

The methods of encoding and decoding multi-view video may be embodied as computer programs. Computer programmers skilled in the art can easily derive code and code segments of the computer program. The computer program may be stored in a computer readable medium. When the computer program is read and executed using a computer, a method of encoding and decoding multi-view video is performed. The computer readable medium may be a magnetic recording medium, an optical recording medium, or a carrier wave.

As described above, according to aspects of the present invention, video is adaptively encoded according to whether the video has the camera parameters and whether the camera parameters are reliable, thereby increasing the efficiency of video compression. Also, intermediate-view frames are adaptively generated according to camera parameter information included in an input bitstream, thereby improving the quality of video to be displayed.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of generating multi-view video using camera parameter information, comprising:
   receiving input bitstream comprising camera parameter information of each of a plurality of videos, wherein the camera parameter information comprises a plurality of flags each corresponding to one of the plurality of videos and indicating whether camera parameters are present in the corresponding video,
   extracting camera parameter information of each of the plurality of videos from input bitstreams in predetermined video units; and
   generating the multi-view video based on the camera parameter information which is extracted, wherein the camera parameters comprises intrinsic camera characteristics comprising a focal length and a principal point,
   wherein the flag equals to 1 indicates the presence of camera parameters and the flag equals to 0 indicates the absence of camera parameters,
   wherein generating the multi-view video comprises checking each flag and the camera parameters are used for generating the multi-view video when the checked flag equals to 1.

2. The method of claim 1, wherein the generating of the multi-view video comprises determining a reference video for generating the multi-view video based on the camera parameter information which is extracted; and
   generating the multi-view video using the reference video which is determined.

3. The method of claim 1, wherein the camera parameter information comprises a flag which indicates whether the camera parameters are reliable.

4. The method of claim 1, wherein the camera parameters comprise at least one of a width and a height of a pixel, a skew angle, numbers of horizontal and vertical pixels of a camera sensor, a radial distortion coefficient, and a tangential distortion coefficient.

5. The method of claim 1, wherein the input bitstreams comprise the camera parameter information which indicates whether the camera parameters are reliable.

6. The method of claim 1, wherein the predetermined video units are units of slices, the camera parameter information, which indicates whether the camera parameters exist and whether the camera parameters are reliable, is inserted as two-bit information into a slice header of each input bitstream.

* * * * *